United States Patent [19]

Bejtlich, III

[11] Patent Number: 5,785,278
[45] Date of Patent: Jul. 28, 1998

[54] PRESSURE DEPENDENT PARACHUTE RELEASE DEVICE FOR AIR/WATER ROCKETS

[76] Inventor: Chester Louis Bejtlich, III, 19 Clover Cir., Reading, Mass. 01867

[21] Appl. No.: 864,835

[22] Filed: May 29, 1997

[51] Int. Cl.$^6$ ............................................. B64D 17/62
[52] U.S. Cl. ........................... 244/139; 244/147; 244/150; 446/52; 446/429
[58] Field of Search ................................. 244/139, 147, 244/149, 150; 446/429, 50, 51, 52

[56] References Cited

U.S. PATENT DOCUMENTS

| | | | |
|---|---|---|---|
| 1,938,931 | 12/1933 | Newman . | |
| 2,559,458 | 7/1951 | Orr . | |
| 2,607,159 | 8/1952 | Hunt . | |
| 2,758,808 | 8/1956 | Nunn | 244/150 |
| 2,870,570 | 1/1959 | Benson | 446/52 |
| 3,086,317 | 4/1963 | Quercetti . | |
| 3,218,755 | 11/1965 | Quercetti . | |
| 3,415,010 | 12/1968 | Belz . | |
| 3,820,275 | 6/1974 | Green | 446/52 X |
| 3,822,502 | 7/1974 | Belz . | |
| 3,992,999 | 11/1976 | Chevrier et al. | 244/149 X |
| 4,836,477 | 6/1989 | Baggarley et al. | 244/147 |
| 5,407,375 | 4/1995 | Johnson . | |
| 5,538,453 | 7/1996 | Johnson | 446/429 X |
| 5,549,497 | 8/1996 | Johnson . | |

*Primary Examiner*—William Grant

[57] ABSTRACT

A pressure dependent parachute release device having a primary storage volume, a check valve between the primary storage volume and a secondary storage volume, a pressure operable valve, the outlet of which is connected to the inlet of a flow restrictor, with the outlet of the flow restrictor being connected to a pressure operated actuator. The inlet of the check valve and a primary port of the pressure operable valve are in fluid communication with the primary storage volume, and a secondary port of the pressure operable valve and the outlet of the check valve are in fluid communication with the secondary storage volume. The pressure operable valve is first set to a primary position, blocking communication from the secondary storage volume to the outlet. A pressure differential between the primary and secondary storage volumes shifts the valve to a secondary position allowing fluid communication between the secondary storage volume and the pressure operated actuator via the flow restrictor. The resulting movement of the pressure operated actuator enables release of the parachute. In a preferred embodiment, the pressure dependent parachute release device is used to open the nose section of an air/water rocket.

8 Claims, 5 Drawing Sheets

PRESSURE DEPENDENT PARACHUTE RELEASE DEVICE FOR AIR/WATER ROCKETS

BACKGROUND—FIELD OF INVENTION

This invention relates to devices for releasing or deploying parachutes on toy air/water rockets.

BACKGROUND—DESCRIPTION OF PRIOR ART

Toy rockets usually have some form of parachute and a means for deploying the parachute while the rocket is in flight. Air/water type rockets have been built with both passive deployment schemes and active deployment schemes. In one passive scheme a simple parachute may be draped over a nose section of a rocket. When the rocket is launched the parachute stays in place until the rocket begins to fall. When the rocket begins it descent the parachute may catch the wind and deploy or it may stay on the nose of the rocket depending upon the trajectory and design of the rocket. In another passive scheme a parachute may be placed within a nose section which rests on or connects to the forward end of a rocket. In this scheme the parachute must fall out of the nose section to deploy. Deployment of the parachute in this case is also dependent upon rocket design and trajectory. In any case passive systems involve a certain amount of luck for a parachute to deploy.

An active deployment scheme can be described as a system that utilizes a secondary energy source to cause a parachute to be released. In U.S. Pat. No. 5,407,375 to Johnson Apr. 18, 1995 one such active system is described, "A latch mechanism releasably secures the hatch in its closed position. A trigger assembly includes a flap that is presented to the wind during flight of the rocket and that has a first position securing the latch mechanism and a second position releasing the latch mechanism to open the hatch. The flap is oriented such that the force of the impinging wind urges the flap to its first position. The latch is spring biased toward its second position with a biasing force chosen to move the flap to its second position when the force of the wind on the flap falls below a predetermined value thus releasing and deploying the parachute when the rocket slows to a selected speed." In U.S. Pat. No. 5,549,497 to Johnson, Aug. 27, 1996 a similar active system is described, "The hatch is configured to be engaged and disengaged with a catch mounted to the rocket body. With the initial forward movement of the launched rocket the inertia and/or the force of the wind upon the nose section causes the disengagement of the catch whereby the continued movement of the rocket creates a wind upon the nose section which maintains the hatch in its bay closed position. However, as the rocket reaches its apogee the biasing force of the spring biased hinge overcomes the force of the wind upon the nose section so as to pivot the nose cone so as to disengage the hatch for parachute release." In U.S. Pat. No. 2,559,458 to Orr, Jul. 3, 1951 a similar system consisting of springs and latches is described. In U.S. Pat. No. 2,607,159 to Hunt, et. al. Aug. 19, 1952, another system consisting of springs and latches is described. In U.S. Pat. No. 3,086,317 to Quercetti, Apr. 23, 1963, again another system of latches and springs is used to deploy a parachute. In U.S. Pat. 3,218,755 to Quercetti, Nov. 23, 1965 a delayed parachute opening device utilizing elastic cable and an aerodynamic presetting device is described. In U.S. Pat. No. 3,415,010 to Belz, Dec. 10, 1968 a latch system with magnets for stored energy is described. In U.S. Pat. No. 3,822,502 to Belz, Jul. 9, 1974, another similar system for deployment utilizing magnets, an elastic band and trigger mechanism is described. In U.S. Pat. No. 1,938,931 to Newman et. al. Dec. 12, 1933, a parachute toy is described that utilizes a resilient material to open a container containing a parachute.

All of the previous parachute deployment systems employ either springs, magnets, rubber or elastic materials along with some aerodynamic triggering means. Due to their dependence on aerodynamics, rocket velocity, wind speed and direction, the reliability of many of the previous devices is questionable. Many of the devices employ complicated mechanisms which add undesirable weight to the rocket thus compromising the ultimate altitude attained by the rocket. Many devices can only be used on rocket systems designed for them. None of the release mechanisms are designed to release a parachute at a predestined time during the flight of the rocket.

OBJECTS AND ADVANTAGES

Accordingly the foregoing limitations and disadvantages of the prior art are overcome by the present invention which incorporates a device utilizing compressed air to release or deploy a parachute as well as propel a rocket. The invention presented in this application provides a simple reliable means for releasing a parachute from a conventional "soda bottle" style bottle rocket. A "soda bottle" being defined as a soft drink container fabricated from PET plastic, otherwise known as thermoplastic polyester. A bottle is used as a pressure vessel becoming the thrusting portion of a rocket body. (Other similar containers may be deemed suitable for use as a rocket body.) In traditional air/water rockets the rocket body is partially filled with water while the remaining volume is charged with compressed air. The compressed air provides the energy to expel the water from the mouth of the bottle, thus providing the necessary thrust to propel the rocket.

The deployment system in this invention relies solely upon a change in internal pressure in the rocket body to activate the release device. The release device, when activated, utilizes compressed air stored in a secondary volume to move a piston or air cylinder which in turn releases a parachute. The invention utilizes a fraction of the total stored energy in the compressed air (which is also used to propel the rocket) to release a parachute. Unlike other deployment systems it does not require secondary stored energy sources, such as springs, elastic bands and magnets to actuate the deployment system. The invention can be used or adapted for use on most plastic "soda bottle" style air/water bottle rockets. The invention can be designed into most other conventional air/water rockets. The invention can be easily calibrated to release or deploy a parachute at a predetermined time during the flight of the rocket. The release timing is based upon T=0 being the time of the launch. Unlike other deployment systems the velocity of the rocket is not critical for release of the parachute. Aerodynamics does not play a critical part in the release of nose section hatches or panels. The invention is repeatable and reliable in its operation. Further objects and advantages of this invention will become apparent from a consideration of the drawings and ensuing description.

DRAWING FIGURES

In FIG. 1 through 8 various embodiments of the invention are depicted. For simplicity, rocket fins and launching mechanisms are not depicted.

Figure 1:
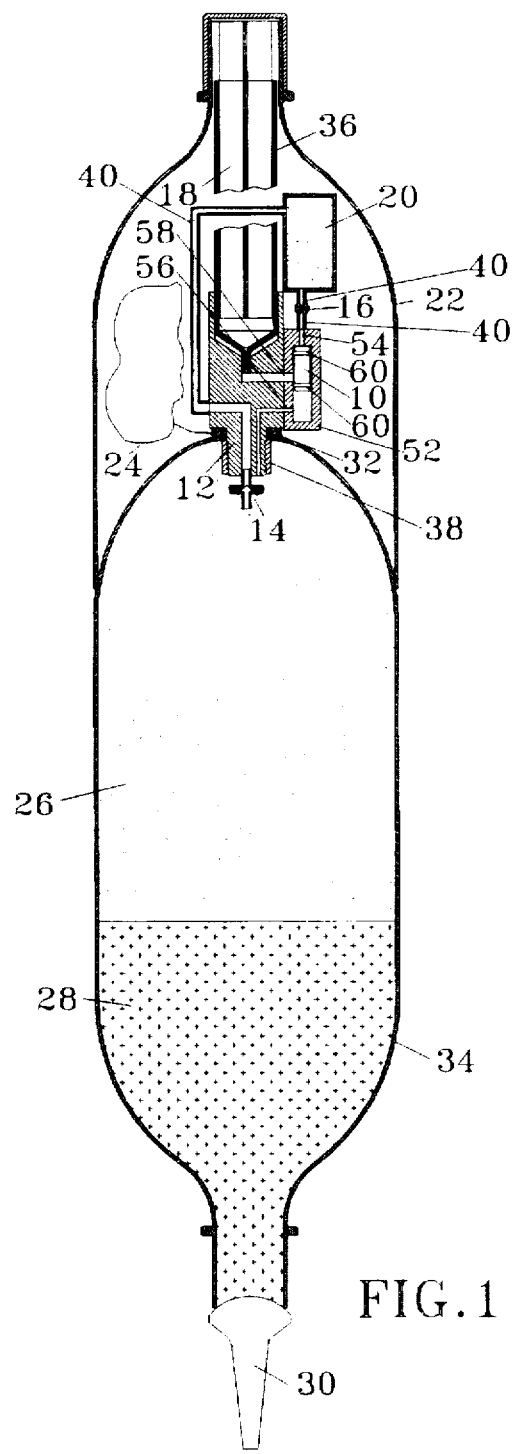
FIG. 1 is a sectional view of a rocket body shown with an external release device. The rocket is shown as it would look just prior to launch.

| Reference Numerals in Drawings | |
|---|---|
| 10 | spool |
| 12 | bottle connector/support structure |
| 14 | check valve |
| 16 | flow restrictor |
| 18 | piston |
| 20 | secondary storage volume |
| 22 | nose section |
| 24 | parachute |
| 26 | compressed air |
| 28 | water |
| 30 | valve stem |
| 32 | gasket |
| 34 | primary storage volume/bottle rocket body |
| 36 | connector nut |
| 38 | cylinder |
| 40 | tubing |
| 42 | attaching lines |
| 44 | retaining collar |
| 46 | primary nose section |
| 48 | secondary nose section |
| 50 | retaining tab |
| 52 | valve body |
| 54 | secondary port |
| 56 | primary port |
| 58 | outlet port |
| 60 | spool valve seal |

SUMMARY

The present invention involves parachute release device used in conjunction with an air/water rocket. The release device is comprised of two storage volumes, one of which being the rocket body, a valve assembly, a check valve, a flow restrictor and an air driven actuator.

DESCRIPTION—FIGS. 1 TO 8

Figure 2:
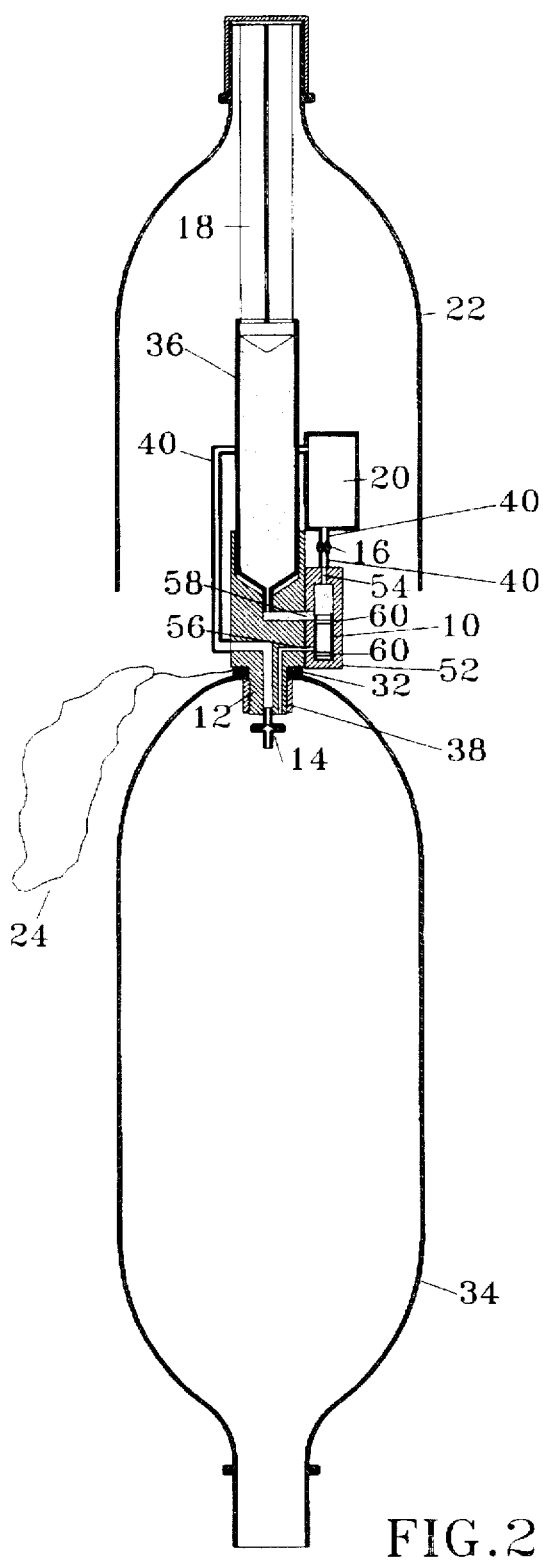
FIG. 2 depicts the same rocket as in FIG. 1 as it would look after the parachute release device has been activated.

FIGS. 1 and 2 show section views of a rocket with an external release device. The release device is comprised of a primary storage volume/bottle rocket body 34, a check valve 14, a secondary storage volume 20, a flow restrictor 16, a spool valve assembly and an air cylinder assembly. The spool valve assembly is comprised of a valve body 52, a spool 10, and spool valve seals 60. The spool valve seals 60 are typically either "O" ring seals or "U" cup seals made from an elastomeric material. The valve body has a primary port 56, a secondary port 54, and an outlet port 58. The air cylinder assembly is comprised of a cylinder 38 and a piston 18. These components are shown as they would be interconnected as a system. The check valve 14 is in fluid communication with the secondary storage volume 20 directionally to allow only passage of air into the secondary storage volume 20. The secondary storage volume 20 is also in fluid communication with the secondary port 54 of the spool valve assembly. The primary port 56 of the spool valve assembly is in fluid communication with the primary storage volume 34. The outlet port 58 is in fluid communication with the inlet of the flow restrictor 16. The outlet of the flow restrictor 16 is in fluid communication with the cylinder 38. Tubing 40 is used to provide fluid communication where necessary. A bottle connector/support structure 12 connects to cylinder 36. The bottle connector 12 which acts as a structure to support the nose assembly may also serve as an air manifold. An air driven piston 18 is contained within the cylinder 36. Also shown in FIG. 1 is compressed air 26, water 28, a valve stem 30, a parachute 24, a movable nose section 22, and a gasket 32. The gasket provides an air tight seal between the primary storage volume 34 and the bottle connector 12. A connector nut 36 is used to secure the bottle connector 12 to the primary storage volume 34 and to compress the gasket 32. The nose section 22 is shown as portion of a bottle similar to the primary storage volume 34 used as the rocket body. It is shown attached to the end of the piston 18.

Figure 3:
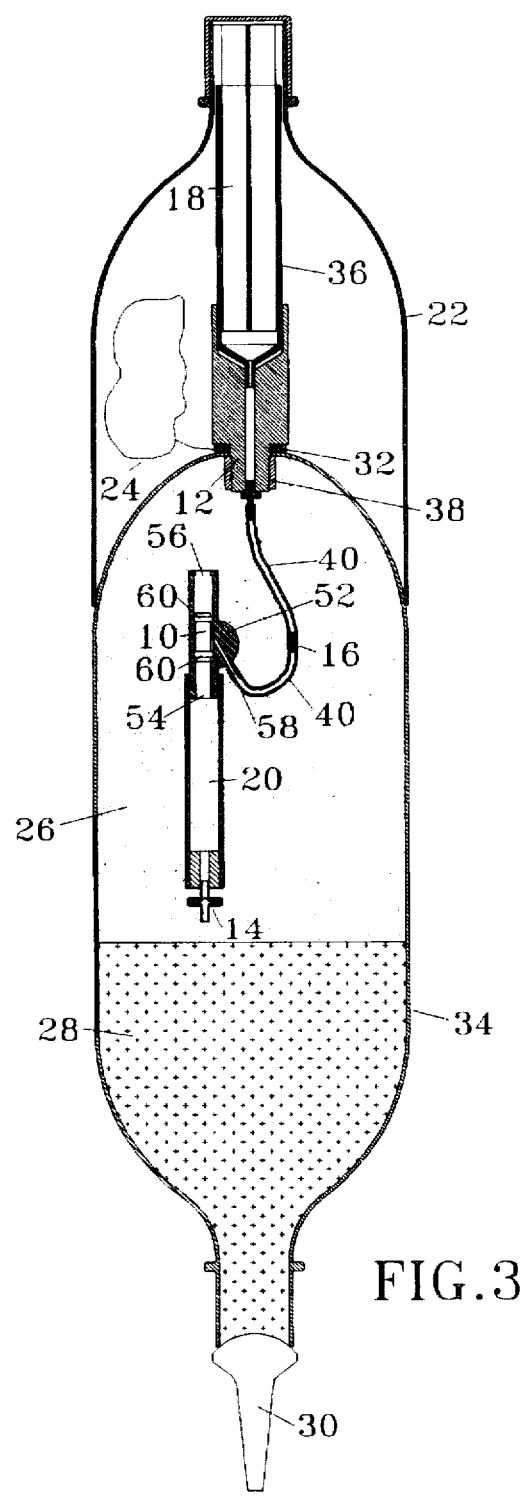
FIG. 3 is a sectional view of a rocket with an internal release device. The rocket is shown as it would look just prior to launch.
Figure 4:
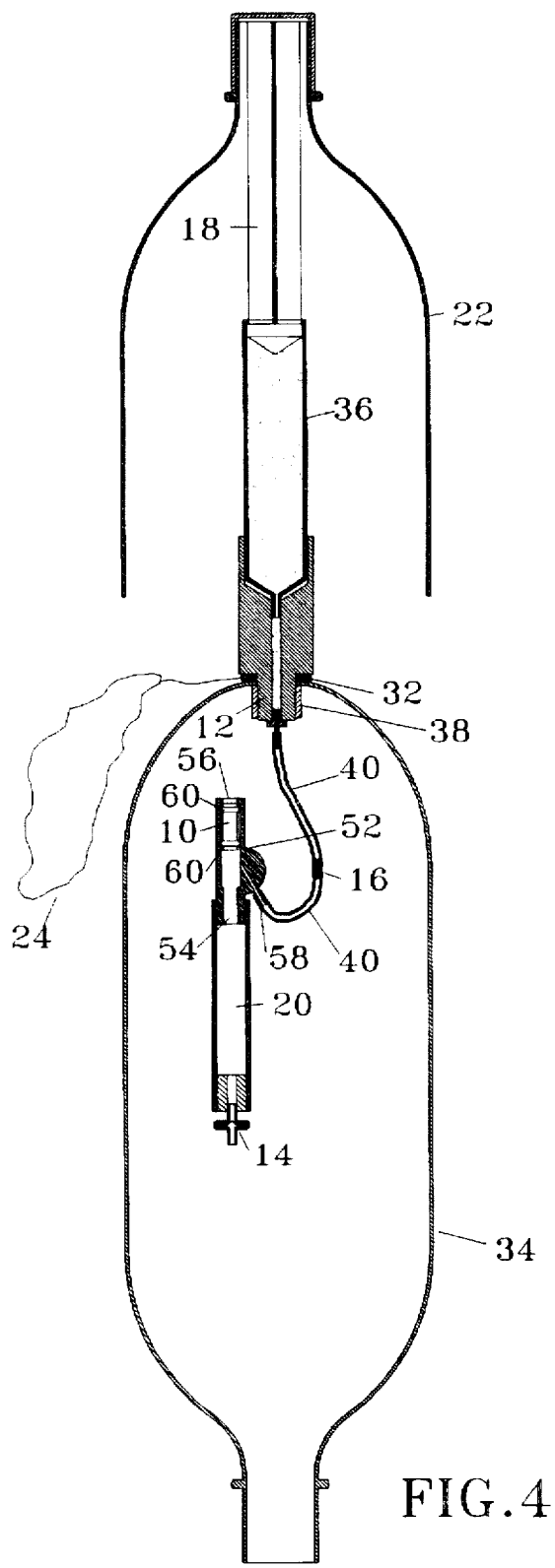
FIG. 4 depicts the same rocket as in FIG. 3 as it would look after the parachute release device has been activated.

FIGS. 3 and 4 depict a similar embodiment of the invention with the release device components assembled within the bottle 34. The spool valve assembly and fluid connections are functionally the same but are shown as they might be connected within a rocket body.

Figure 5:
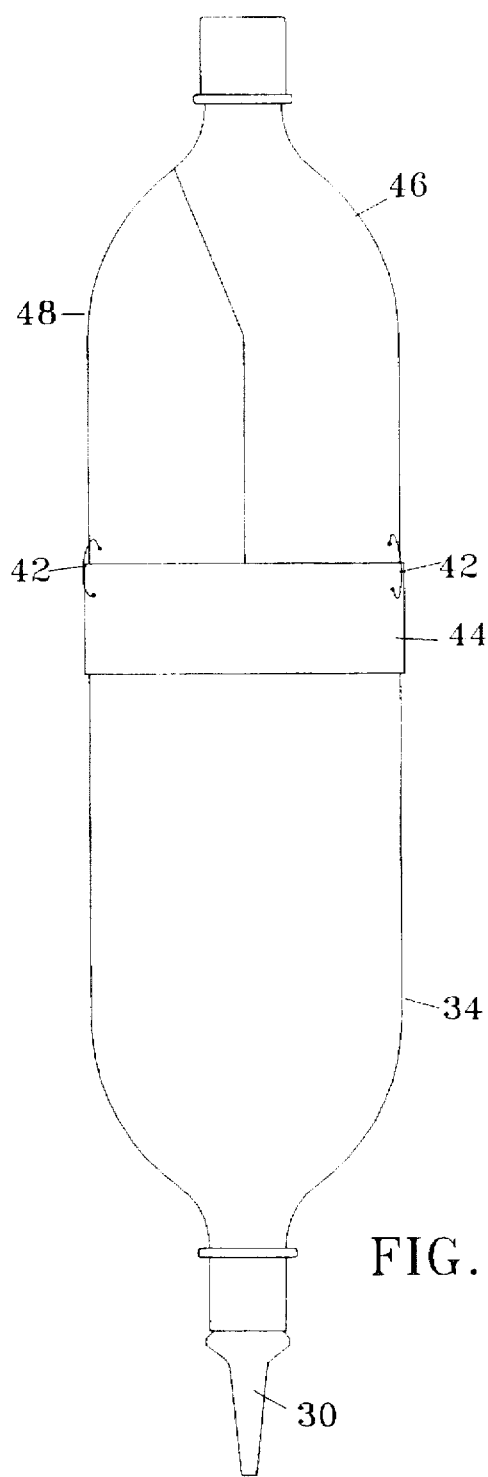
FIG. 5 is an external view of a rocket with a split nose section shown prior to launch.
Figure 6:
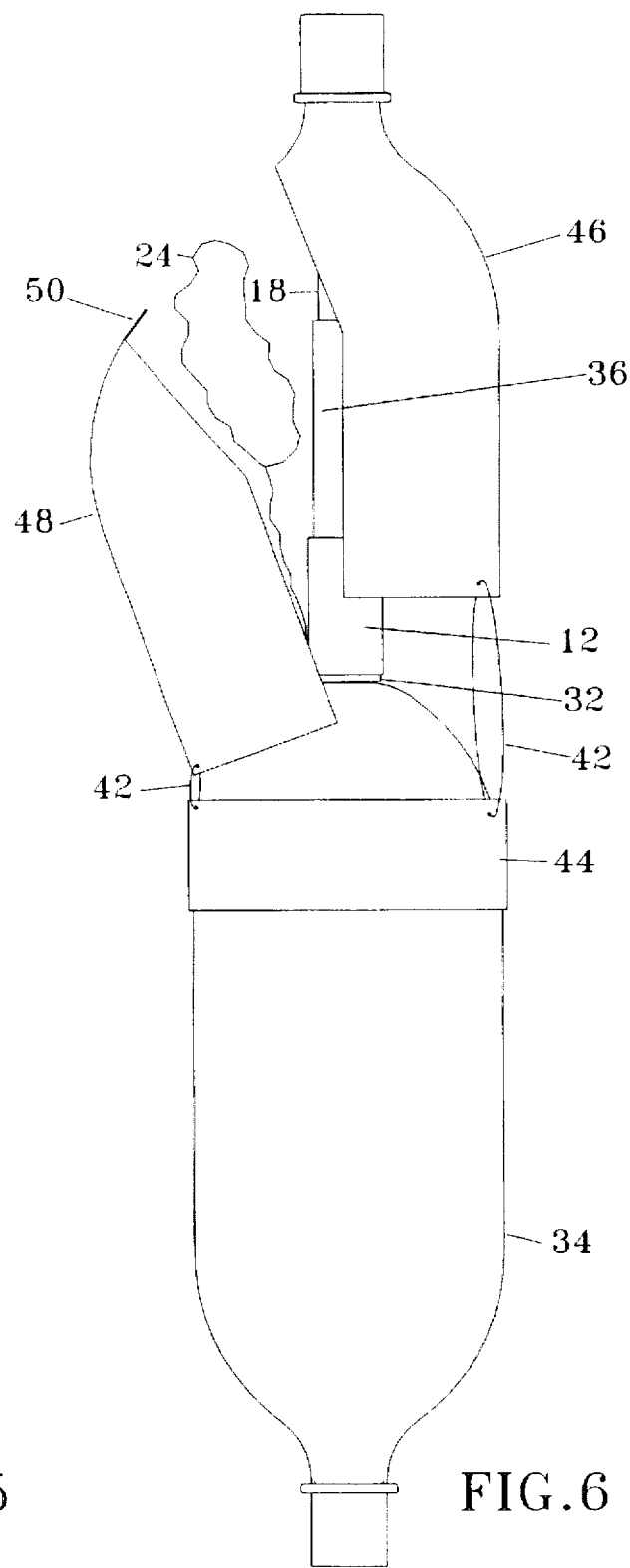
FIG. 6 is an external view of a rocket with a split nose section shown after the release device has been activated.

FIGS. 5 and 6 show an external view of a rocket assembly with a split nose section assembly. In the split nose section there is a secondary nose section 48, a primary nose section 46, a retaining tab 50, a retaining collar 44 and attaching lines 42.

Figure 7:
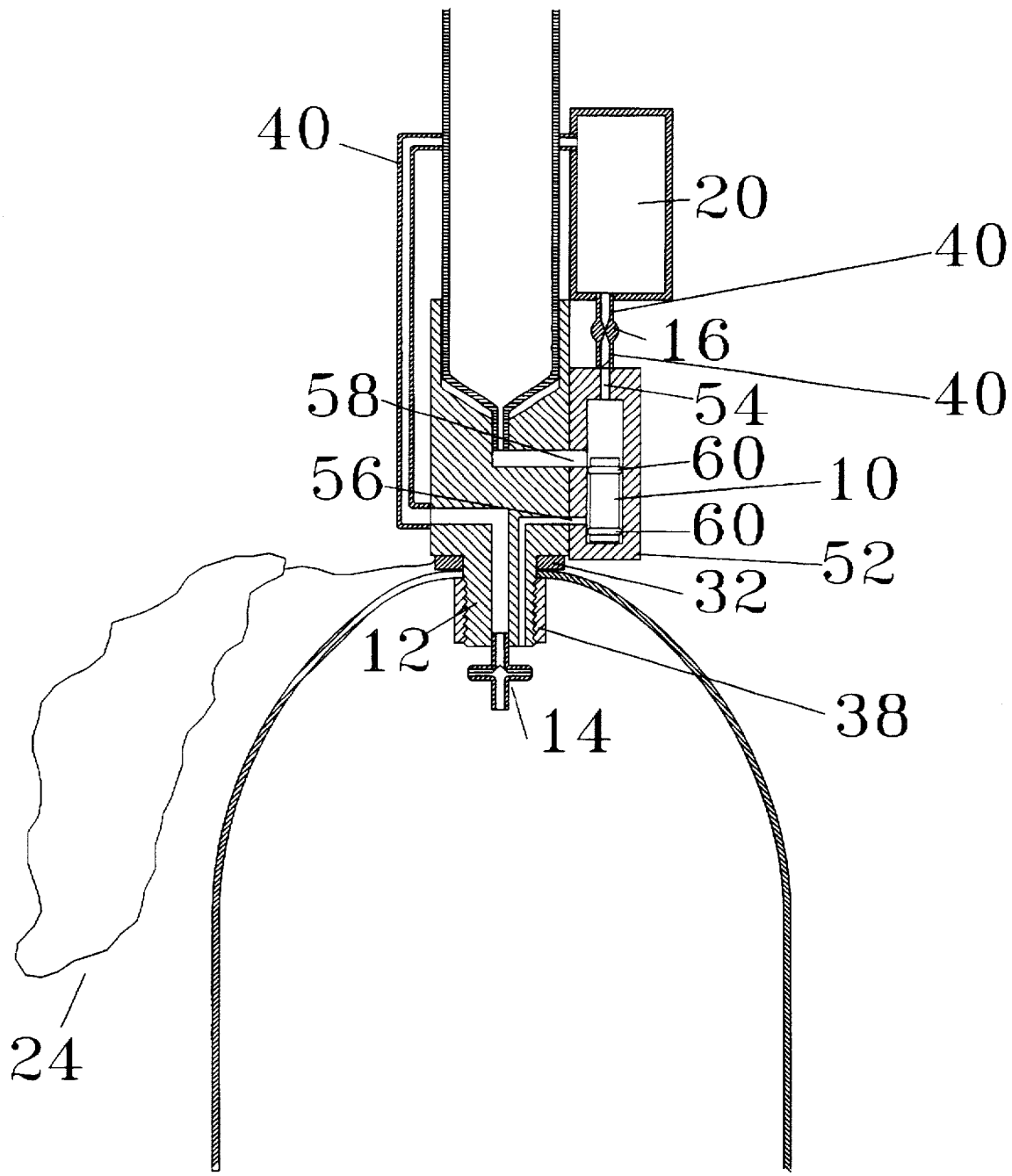
FIG. 7 is an enlarged view of the valve portion of FIG. 2.
Figure 8:
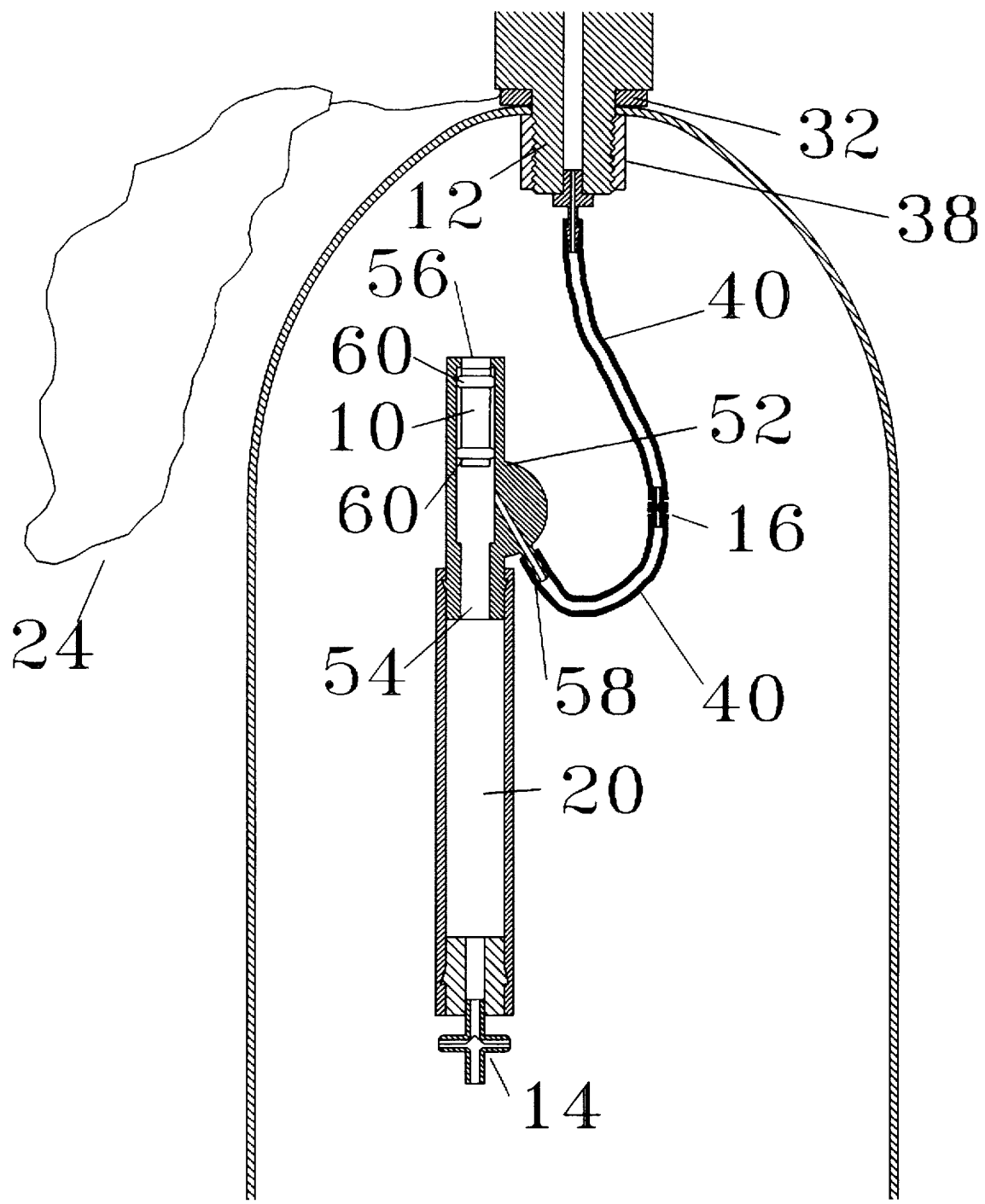
FIG. 8 is an enlarged view of the valve portion of FIG. 4.

FIG. 7 is an enlargement of a section of FIG. 2 and FIG. 8 is an enlargement of FIG. 4. These enlargements clarify some of the smaller details.

Operation

This invention operates in conjunction with an air/water rocket beginning with the preparation of the spool valve assembly. The spool 10 must be positioned towards the secondary port 54 of the valve body 52. This may be accomplished by breaking the connection at the flow restrictor 16 and pressurizing the primary storage volume 34 until the spool 10 shifts towards the secondary port 54 as shown in the embodiment in FIGS. 1, 2, and 7. In the embodiment shown in FIGS. 3, 4, and 8, positioning the spool 10 may be accomplished by removing the spool valve assembly from the inside of the primary storage volume 34 and pushing the spool 10 towards the secondary port 54 with a small rod.

With the spool 10 properly positioned, water 28 may be added to the primary storage volume 34. The rocket assembly may then be mounted on an appropriate launching mechanism and pressurized with compressed air 26 through a valve stem 30 to a desired launch pressure. A parachute 24 would be prepared, attached to the rocket assembly and located within the nose section 22 or 46 & 48. Prior to launch the piston 18 would be in the retracted position with a preferred nose section attached. The rocket would then be ready for launch.

As the primary storage volume 34 is pressurized, compressed air 26 fills the volume above the water 28. In addition, compressed air also flows through the check valve 14 and fills the secondary air volume 20. Prior to launch the air pressures in the in the primary storage volume 34 and in the secondary air volume 20 remain equivalent. With equivalent air pressure on both sides of the spool 10 there is no biasing force applied to the spool. Immediately after launch, air pressure in the primary storage volume 34 begins to drop as thrusting water exits the primary storage volume 34. Within a brief period of time after launch the pressure in the primary storage volume 34 drops to equal atmospheric pressure and a differential pressure develops between the primary port 56 and the secondary port 54 of the spool valve assembly. Once a critical pressure differential across the spool valve assembly is reached (depending upon the construction of the spool valve assembly) the spool 10 shifts position towards the primary port 56. The shift of the spool 10 allows trapped compressed air in the secondary air volume 20 to flow through the outlet port 58, through the flow restrictor 16, and into the cylinder 38. As compressed air flows into the cylinder 38 the piston 18 is forced away from the primary storage volume 34 thus moving the nose section 22, or primary nose section 46. The nose section's movement allows the parachute 24 to be released and deployed in the air flowing by the rocket.

Timing of the piston 18 movement can be adjusted and thus controlled by varying the orifice size of the flow restrictor 16. The operation and timing can be otherwise adjusted by varying the volume of the secondary air volume 20 and the volume between the flow restrictor 16 and the cylinder 38.

Conclusions Ramifications and Scope

Accordingly the reader will see that the mechanism of the pressure dependent parachute release device invention is unique in its approach for releasing a parachute. In addition the invention is somewhat simpler in design and construction than other designs. It is easy to use, it is predictable in its operation and most importantly it is reliable.

While the invention as it has been described with respect to preferred embodiments, it is contemplated that various changes may be made in the invention without departing from the spirit and scope thereof. For example there are numerous configurations in which the pneumatic components can be fabricated, interconnected and attached to the rocket body. There are also a variety of valve designs that may also be used in an equivalent fashion. Many of the components can be fabricated from a wide variety of materials. The design of the nose section components could also be varied.

Accordingly changes and modifications of the specifically described embodiments can be carried out without departing from the scope of the invention. The scope of the invention should be determined not by the embodiments illustrated, but by the appended claims and their legal equivalents.

I claim:

1. A pressure dependent parachute release device comprising:
   a. a primary storage volume
   b. a check valve having an inlet and an outlet, the inlet of said check valve being in fluid communication with said primary storage volume
   c. a secondary storage volume in fluid communication with the outlet of said check valve
   d. a flow restrictor means having an inlet and an outlet
   e. a pressure operable valve means having a primary port, a secondary port and an outlet port, said valve means being operable by differential air pressure between the primary port and the secondary port, said valve means being operable through a first position and a second position, the first position of said valve means preventing fluid communication between the secondary port and the outlet of said valve means, the second position of said valve means allowing fluid communication between the secondary port and the outlet port of said valve means, the secondary port of said valve means being in fluid communication with said secondary storage volume, the primary port of said valve means being in fluid communication with said primary storage volume, the outlet port of said valve means being in fluid communication with the inlet of said flow restrictor means
   e. an actuator means for converting pressurized air to linear motion, said linear motion enabling release of a parachute, said actuator means having a fixed cylinder with an inlet port in fluid communication with the outlet of said flow restrictor means, said actuator means having a movable piston driven by compressed air whereby when said valve means is in its first position and a pressure differential between said primary storage volume and said secondary storage volume urges said valve means to its second position compressed air in said secondary storage volume is allowed to flow controllably through said flow restrictor means and into said actuator means thus being converted into linear motion at a predetermined rate thus enabling the release of said parachute.

2. The release device of claim 1 wherein said primary storage volume is constructed from a plastic soda bottle.

3. The release device of claim 2 wherein said plastic soda bottle is composed of a thermoplastic polyester.

4. The release device of claim 1 wherein said flow restrictor means has a fixed orifice.

5. The release device of claim 4 wherein said flow restrictor means is replaceable by different flow restrictor means having a different sized orifice.

6. The release device of claim 1 wherein said valve means is a spool valve.

7. The release device of claim 1 wherein said actuator means is an air cylinder.

8. The release device of claim 1 wherein said actuator means is a syringe.

* * * * *